(12) United States Patent
Takahashi

(10) Patent No.: US 6,781,766 B2
(45) Date of Patent: Aug. 24, 2004

(54) PROJECTION OPTICAL SYSTEM

(75) Inventor: Tomowaki Takahashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/337,860

(22) Filed: Jan. 8, 2003

(65) Prior Publication Data

US 2003/0137745 A1 Jul. 24, 2003

Related U.S. Application Data

(63) Continuation of application No. 09/531,009, filed on Mar. 20, 2000, now Pat. No. 6,538,821, which is a continuation-in-part of application No. PCT/JP98/04263, filed on Sep. 22, 1998.

(30) Foreign Application Priority Data

Sep. 22, 1997 (JP) .............................................. 9-276499

(51) Int. Cl.[7] .............................. G02B 9/00; G02B 9/60; G03B 27/54
(52) U.S. Cl. ....................... 359/649; 359/763; 359/766; 355/67
(58) Field of Search ................................. 359/649–651, 359/642, 728, 754, 763, 766; 349/5, 6; 355/53, 67

(56) References Cited

U.S. PATENT DOCUMENTS

| | | | |
|---|---|---|---|
| 4,948,238 A | 8/1990 | Araki et al. ................. 359/708 |
| 5,170,207 A | 12/1992 | Tezuka et al. ................ 355/53 |
| 5,260,832 A | 11/1993 | Togino et al. ............... 359/679 |
| 5,296,967 A | * 3/1994 | Moskovich .................. 359/649 |
| 5,448,408 A | 9/1995 | Togino et al. ............... 359/651 |
| 5,555,479 A | 9/1996 | Nakagiri ..................... 359/355 |
| 5,623,365 A | 4/1997 | Kuba .......................... 359/569 |
| 5,636,000 A | 6/1997 | Ushida et al. ................ 355/30 |
| 5,781,278 A | 7/1998 | Matsuzawa et al. .......... 355/53 |
| 5,805,344 A | 9/1998 | Sasaya et al. ............... 359/649 |
| 5,808,814 A | 9/1998 | Kudo .......................... 359/754 |
| 5,831,776 A | 11/1998 | Sasaya et al. ............... 359/754 |
| 5,835,285 A | 11/1998 | Matsuzawa et al. ........ 359/754 |
| 5,852,490 A | 12/1998 | Matsuyama .................. 355/67 |
| 5,856,884 A | 1/1999 | Mercado ..................... 359/649 |
| 5,903,400 A | 5/1999 | Endo .......................... 359/758 |
| 5,920,379 A | 7/1999 | Matsuyama .................. 355/67 |

(List continued on next page.)

FOREIGN PATENT DOCUMENTS

| | | |
|---|---|---|
| EP | 0 828 172 | 3/1998 |
| EP | 0 863 440 | 9/1998 |
| EP | 1 006 387 | 6/2000 |
| EP | 1 094 350 | 4/2001 |
| JP | 5-34593 | 2/1993 |
| JP | 7-128592 | 5/1995 |
| JP | 8-220431 | 8/1996 |
| JP | 9-105861 | 4/1997 |

*Primary Examiner*—Georgia Epps
*Assistant Examiner*—William Choi
(74) *Attorney, Agent, or Firm*—Miles & Stockbridge P.C.

(57) ABSTRACT

A projection optical system comprises a first lens group with positive power, a second lens group with negative power, a third lens group with positive power, a fourth lens group with negative power, and a fifth lens group with positive power. At least one of the first, second, and third lens group has an aspherical surface. A lens arrangement of one embodiment has a plurality of waists of lenses, with aspherical surface before and after a first waist.

22 Claims, 6 Drawing Sheets

U.S. PATENT DOCUMENTS

| | | | |
|---|---|---|---|
| 5,930,049 A | 7/1999 | Suenaga et al. | 359/650 |
| 5,943,172 A | 8/1999 | Sasaya et al. | 359/754 |
| 5,956,182 A | 9/1999 | Takahashi | 359/649 |
| 5,969,803 A | 10/1999 | Mercado | 355/67 |
| 5,986,824 A | 11/1999 | Mercado | 359/754 |
| 5,990,926 A | 11/1999 | Mercado | 347/258 |
| 6,008,884 A | 12/1999 | Yamaguchi et al. | 355/53 |
| 6,084,723 A | 7/2000 | Matsuzawa et al. | 359/754 |
| 6,088,171 A | 7/2000 | Kudo | 359/754 |
| 6,104,544 A | 8/2000 | Matsuzawa et al. | 359/649 |
| 6,198,576 B1 | 3/2001 | Matsuyama | 359/649 |
| 6,259,508 B1 | 7/2001 | Shigematsu | 355/53 |
| 6,333,781 B1 | 12/2001 | Shigematsu | 355/71 |
| 6,349,005 B1 | 2/2002 | Schuster et al. | 359/754 |
| 6,377,338 B1 | 4/2002 | Suenaga | 355/67 |
| 2001/0050820 A1 | 12/2001 | Shafer et al. | 359/766 |
| 2002/0001141 A1 | 1/2002 | Shafer et al. | 359/766 |
| 2002/0008861 A1 | 1/2002 | Singer et al. | 355/53 |
| 2002/0149855 A1 | 10/2002 | Schuster | |

\* cited by examiner

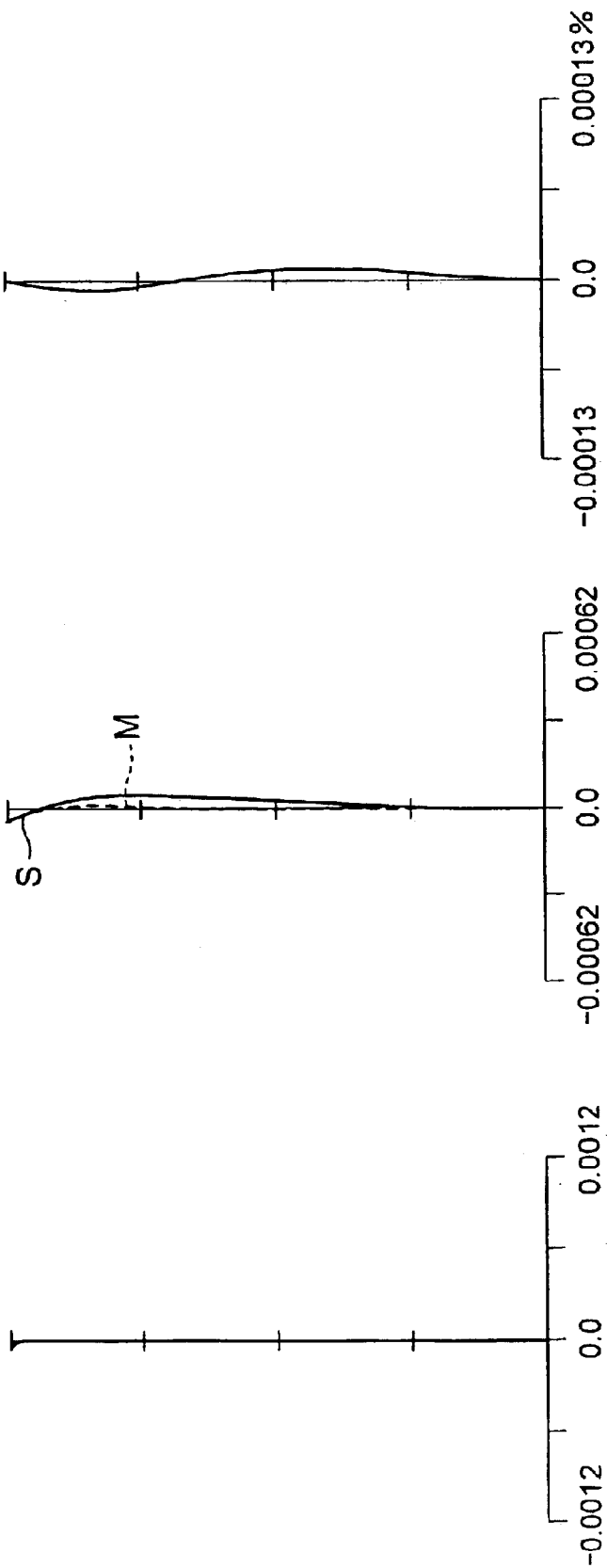

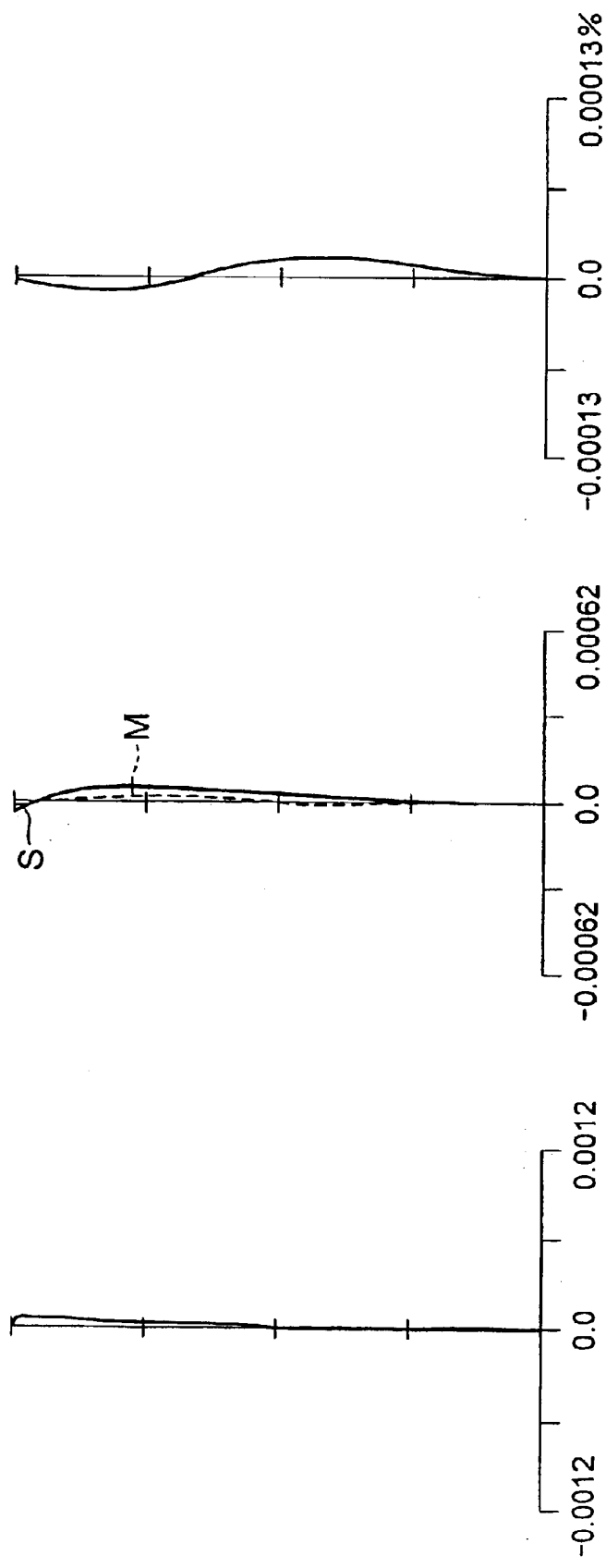
FIG. 5A SPHERICAL ABERRATION NA=0.75
FIG. 5B ASTIGMATISM Y=13.2
FIG. 5C DISTORTION Y=13.2

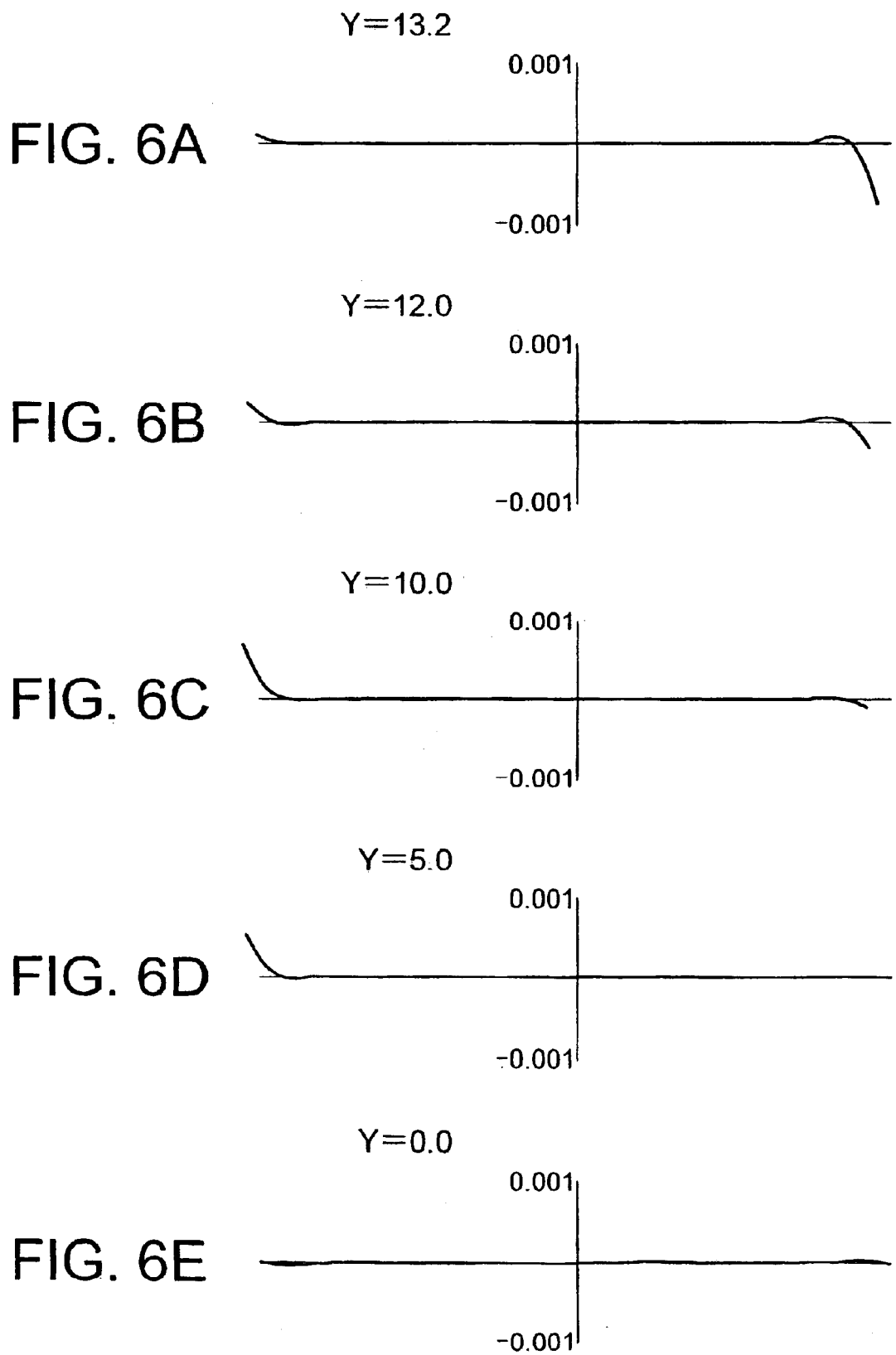

PROJECTION OPTICAL SYSTEM

CROSS-REFERENCE TO RELATED APPLICATION

This application is a continuation of U.S. application Ser. No. 09/531,009 filed Mar. 20, 2000, now U.S. Pat. No. 6,538,821 which is a continuation-in-part of International Application No. PCT/JP98/04263 filed Sep. 22, 1998.

This application claims the benefit of Japanese Patent application No.9-276499 which is hereby incorporated by reference.

BACKGRAOUND OF THE INVENTION

1. Field of the Invention

The present invention relates to a projection optical system which is employed when a pattern such as an electric circuit pattern drawn on a projection original plate including a reticle or a mask is transferred onto a photosensitive substrate such as a semiconductor wafer or a glass plate coated with photosensitive material by projection photolithography.

2. Related Background Art

Recently, a projection exposure method is fairly generally employed for transferring a necessary pattern onto an integrated circuit such as an IC or a LSI etc., a flat display of such as a liquid crystal etc.

Especially, for manufacturing a semiconductor integrated circuit or a substrate packaging a semiconductor chip therein, a pattern thereof is increasingly miniaturized and a wider projection area is required for a flat display for liquid crystals, or the like. Consequently, an exposure apparatus, especially a projection optical system thereof, for printing such patterns is required to have a higher resolving power and a wider exposure area.

However, any of projection optical systems conventionally employed in an exposure apparatus does not fully satisfy both of such requirements, i.e., a higher resolving power and a wider exposure area.

More specifically, for obtaining a higher resolving power, it is required to enlarge the numerical aperture of the optical system, which inevitably results in an enlarged lens size. In the same manner, in order to obtain a wider exposure area, the lens size is still enlarged since a flat object is to be projected on a flat surface. If the lens size is enlarged, a glass material for the lens is required to have a larger size. However, it becomes difficult to prepare a glass material having a lager size than the current one in terms of the homogeneity of the material, or the like. An enlarged lens size makes another difficulty in a step of polishing the glass material, and it becomes impossible to polish a lens having a larger size than the present one. Under such circumstances, it is an important object to be achieved up to now to reduce the maximum effective diameter of lens of the optical system, while securing a large numerical aperture.

SUMMARY OF THE INVENTION

An object of the present invention is to provide a projection optical system which has a large numerical aperture and a satisfactorily reduced maximum effective diameter of lens of the optical system.

The present invention has been contrived to solve the above-mentioned problem. According to the present invention, there is provided a projection optical system for projecting an image on a first surface onto a second surface, comprises first lens group G1 of positive refracting power including two or more positive lenses, a second lens group G2 of negative refracting power including two or more negative lenses, a third lens group G3 of positive refracting power including three or more positive lenses, a fourth lens group G4 of negative refracting power including two or more negative lenses, and a fifth lens group G5 of positive refracting power including at least six or more consecutive positive lenses, in the named order from the first surface side to the second surface side, wherein either one of the fourth lens group G4 and the fifth lens group G5 has one aspherical surface, the fifth lens group G5 has an aperture stop inside thereof, a portion at which a light flux is diverged right before the aperture stop has a first air lens LA of negative refracting power, the radius of curvature rA1 of the lens surface on the first surface side of the first air lens LA is positive, and a portion at which the light flux is converged at the rear of the aperture stop has a second air lens LB of negative refracting power.

In the projection optical system of the present invention, an aspherical surface is introduced to correct a spherical aberration which is generated due to an enlargement of the numerical aperture. This aspherical surface is to be applied to a portion at which mainly spherical aberration is generated and, more naturally, to a portion at which the spherical aberration can be easily corrected. Consequently, the aspherical surface is to be applied to a portion in the vicinity of the aperture stop. According to the present invention, since the aperture stop is provided in the fifth lens group G5, the aspherical surface is to be applied to the fifth lens group G5 which has this aperture stop therein or to the fourth lens group G4 near the aperture stop.

However, it is more preferable that the aspherical surface should be applied to the portion at which the light flux is converged, in order to avoid the aspherical lens surface from being enlarged. Consequently, in first and second embodiments described below, one surface out of the fourth lens group G4 is selected as the aspherical surface.

Since one of the surfaces is used as the aspherical surface, it is possible to correct a spherical aberration. However, it is also required to correct other aberrations which may be generated due to an enlargement of the numerical aperture.

The projection optical system has not only a high numerical aperture but also a large field size, so that there are generated larger aberrations around the image field. Especially, a coma aberration around the image field is generated to be larger due to the enlargement of the numerical aperture. Further, an amount of a generated coma is normally different depending of an amount of enlargement of the field angle (i.e., increase of the image height). This is called a field angle fluctuation component of a coma aberration.

In order to remove this field angle fluctuation component of the coma aberration, a more complicated correction is required to be conducted. In general, at least another two aspherical surfaces are required for correcting an upper coma and a lower coma, respectively. However, employment of a large number of aspherical surfaces brings about an increase in the cost undesirably. Then, according to the present invention, the field angle fluctuation component of the coma aberration is corrected by a spherical surface, a method of which will be described below.

Generally, in an optical system, the smaller an angle at which a light beam is incident onto each lens surface is, the less aberrations are generated and the more loosen a tolerance or the like becomes, appropriately. Especially, such tendency is strong in an optical system which pursuits the extreme performance of a projection optical system or the like.

However, according to the present invention, there are provided surfaces acting against the light beam to make an angle of incidence large, conversely. These surfaces are a lens surface rA1 on the first surface side of the first air lens LA and a lens surface rB2 on the second surface side of the second air lens LB. Since these air lenses LA, LB are provided in the portions in which the light flux is diverged and the light flux is converged to sandwich the aperture stop therebetween, so that the field angle fluctuation components of the upper coma and the lower coma can be corrected.

Though a considerable amount of aberrations is normally generated on such surfaces oriented to act against light fluxes, converse aberrations are caused by the curved surfaces existing in front or rear thereof and having a similar curvature, that is, the lens surface rA2 on the second surface side of the first air lens LA and the lens surface rB1 on the first surface side of the second air lens LB, so that high order aberrations are corrected by a difference therebetween.

With the above arrangement, the field angle fluctuation component of coma is corrected. As a result, it becomes possible to reduce the maximum effective diameter of lens.

Next, according to the present invention, it is preferable to satisfy the following conditions:

$$0.1 < D/L < 0.3; \quad (1)$$

$$|PA - PB| \times L < 1.0; \quad (2)$$

$$0.2 < |PA| \times L < 2.0; \quad (3)$$

$$0.2 < |PB| \times L < 2.0; \quad (4) \text{ and}$$

$$0.01 < Y/L < 0.02, \quad (5)$$

where
$D = \tan\theta \times f5$;
$\theta = \sin^{-1}[NA/n1]$;
NA: the image side maximum numerical aperture;
nI: the index of refraction of a medium which fills a space between the final lens surface and the second surface;
f5: the focal length of the fifth lens group;
L: the distance from the first surface to the second surface;
PA: the refracting power of the first air lens LA;
PB: the refracting power of the second air lens LB; and
Y: the maximum image height.

Since D provides an almost maximum effective diameter of lens in the condition (1), the condition (1) defines an appropriate range for the maximum effective diameter of lens on the basis of the distance L between the first surface and the second surface. Below the lower limit of the condition (1), the maximum effective diameter of lens becomes smaller, but a satisfactorily large numerical aperture can not be obtained. Conversely, above the upper limit of the condition (1), the maximum effective diameter of lens becomes excessively large, which requires a larger amount of the glass material, resulting in an increase in the cost.

The condition (2) provides a difference between the refracting power PA of the first air lens and the refracting power PB of the second air lens on the basis of the distance L between the first surface and the second surface. Above the upper limit of the condition (2), there is too large difference generated between the refracting powers of the both air lenses, so that the field angle fluctuation components of the upper coma and the lower coma can not be corrected at a time.

Note that the refracting powers PA, PB of the first and second air lenses are defined as follows:

$$PA = (nA1-1)/rA1 + (1-nA2)/rA2;$$

$$PB = (nB1-1)/rB1 + (1-nB2)/rB2;$$

nA1: the index of refraction of a medium on the first surface side of the first air lens LA;
rA1: the radius of curvature on the first surface side of the first air lens LA;
nA2: the index of refraction of a medium on the second surface side of the first air lens LA;
rA2: the radius of curvature on the second surface side of the first air lens LA;
nB1: the index of refraction of a medium on the first surface side of the second air lens LB;
rB1: the radius of curvature on the first surface side of the second air lens LB;
nB2: the index of refraction of a medium on the second surface side of the second air lens LB; and
rB2: the radius of curvature on the second surface side of the second air lens LB.

The conditions (3) and (4) respectively provide the refracting powers PA, PB of the first and second air lenses on the basis of the distance L between the first surface and the second surface. Below the lower limit of the condition (3) or (4), the field angle fluctuation component of the upper coma or the lower coma can not be fully corrected. Conversely, above the upper limit of the condition (3) or (4), a curvature difference between the lens surfaces on the entrance side and on the exit side of the first or second air lens becomes too large, so that a high order aberration can not be satisfactorily corrected.

The condition (5) provides an appropriate display image field size on the basis of the distance L between the first surface and the second surface. Below the lower limit of the condition (5), the lens has the diameter unsuitably large for the reduced image field size, which is undesirable. On the other hand, above the upper limit of the condition (5), the image field size becomes too small, resulting in difficulty in aberration correction.

According to the present invention, it is also preferable to satisfy the following conditions:

$$NA > 0.65; \quad (6)$$

$$0.05 < f2/f4 < 6; \quad (7)$$

$$0.01 < f5/L < 1.2; \quad (8)$$

$$-0.8 < f4/L < -0.008; \quad (9) \text{ and}$$

$$-0.5 < f2/L < -0.005, \quad (10)$$

where
NA: the maximum numerical aperture on the image side;
f2: the focal length of the second lens group;
f4: the focal length of the fourth lens group;
f5: the focal length of the fifth lens group; and
L: the distance between the first surface and the second surface.

The condition (6) provides an appropriate range for the maximum numerical aperture NA on the image side. According to the present invention, it is provided a projection optical system capable of obtaining a large numerical aperture even if the effective diameter of lens is small. As a result, below the lower limit of the condition (6), the effect of the present invention can not be fully obtained.

The condition (7) provides an appropriate range for a ratio between the refracting powers of the fourth lens group G4 of negative refracting power and the second lens group G2 of negative refracting power, in order to correct excellently a curvature of field while maintaining a wide exposure area by approximating a Petzval sum to zero. Below the lower limit of the condition (7), the refracting power of the fourth lens group G4 becomes relatively weak to the refracting power of the second lens group G2, so that a large positive Petzval sum is undesirably generated.

On the other hand, above the upper limit of the condition (7), the refracting power of the second lens group G2 becomes weak relative to the refracting power of the fourth lens group G4, so that a large positive Petzval sum is undesirably generated.

The condition (8) provides an appropriate range for the refracting power of the fifth lens group G5 of positive refracting power, in order to correct a spherical aberration, a distortion and a Petzval sum in a good balance while maintaining a large numerical aperture. Below the lower limit of the condition (8), the refracting power of the fifth lens group G5 becomes too large, so that not only a negative distortion, but also negative spherical aberration are generated to be large in the fifth lens group G5 undesirably. On the other hand, above the upper limit of the condition (8), the refracting power of the fifth lens group G5 becomes too weak, and the refracting power of the fourth lens group G4 of negative refracting power inevitably becomes weak correspondingly. As a result, it becomes impossible to correct a positive Petzval sum satisfactorily.

The condition (9) provides an appropriate range for the refracting power of the fourth lens group G4 of negative refracting power. Below the lower limit of the condition (9), it becomes undesirably difficult to correct a spherical aberration. Conversely, above the upper limit of the condition (9), a coma aberration is generated undesirably. In order to correct a spherical aberration and a Petzval sum satisfactorily, it is preferable to set the lower limit of the condition (9) to −0.078, and it is preferable to set the upper limit of the condition (9) to −0.047 to further suppress generation of a coma aberration.

The condition (10) provides an appropriate range for the refracting power of the second lens group G2 of negative refracting power. Below the lower limit of the condition (10), a Petzval sum becomes a large positive value undesirably. On the other hand, above the upper limit of the condition (10), a negative distortion is undesirably generated. In order to further correct the Petzval sum satisfactorily, it is preferable to set the lower limit of the condition (10) to −0.16. In order to further correct the negative distortion and the coma aberration satisfactorily, it is preferable to set the upper limit of the condition (10) to −0.071.

Next, in the present invention, it is preferable to provide at least one negative lens in the fifth lens group G5. With this arrangement, a distortion can be excellently corrected.

It is also preferable to provide in the fourth lens group G4 of negative refracting power at least two pairs of concave lens surfaces facing each other. With such arrangement, a light beam can be loosely bent, so that generation of especially a spherical aberration can be suppressed.

In the same manner, it is preferable to provide in the second lens group G2 of negative refracting power at least two pairs of concave lens surfaces facing each other. With such arrangement, a light beam can be loosely bent, so that generation of especially an off-axis aberration can be suppressed.

In the same manner, it is preferable to provide in the fifth lens group G5 of positive refracting power at least one pair of convex lens surfaces facing each other. With such arrangement, a light beam can be loosely bent, so that generation of especially a spherical aberration can be suppressed.

In the same manner, it is preferable to provide in the third lens group G3 of positive refracting power at least one pair of convex lens surfaces facing each other. With this arrangement, a light beam can be loosely bent, so that generation of especially an off-axis aberration can be suppressed.

BRIEF DESCRIPTION OF THE DRAWINGS

FIGS. 2A to 2C are aberration views for showing a spherical aberration, an astigmatism and a distortion in the first embodiment.

FIGS. 5A to 5C are aberration views for showing a spherical aberration, an astigmatism and a distortion in the second embodiment.

FIGS. 6A to 6E are aberration views for showing lateral aberrations in the second embodiment.

DESCRIPTION OF THE PREFERRED EMBODIMENTS

Figure 1:
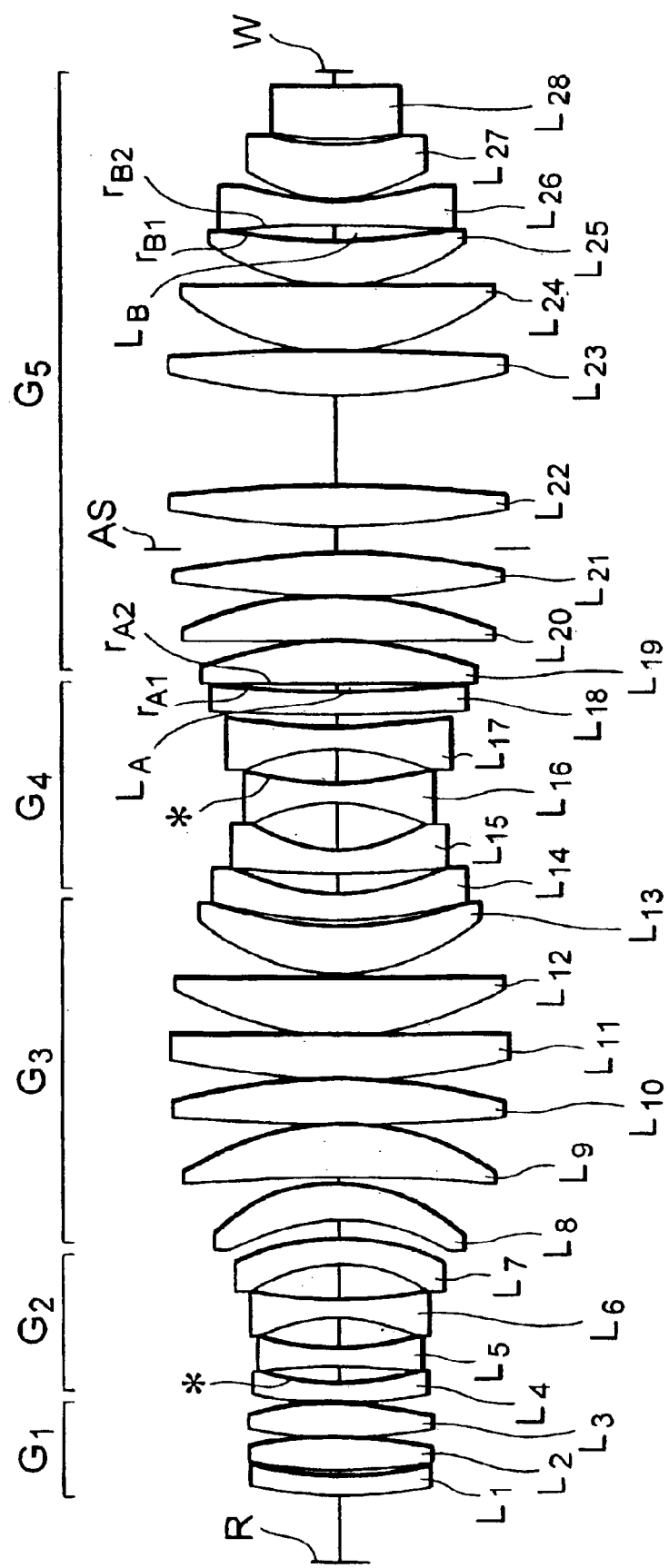
FIG. 1 is a cross-sectional view for showing a lens constitution in a first embodiment of a projection optical system according to the present invention.
Figure 3A:
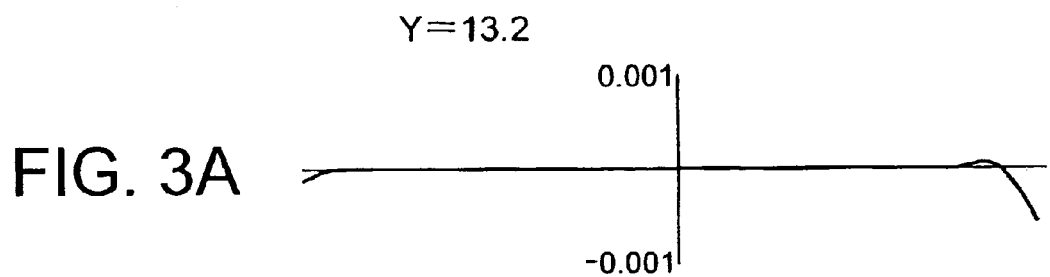
FIGS. 3A to 3E are aberration views for showing lateral aberrations in the first embodiment.
Figure 3B:
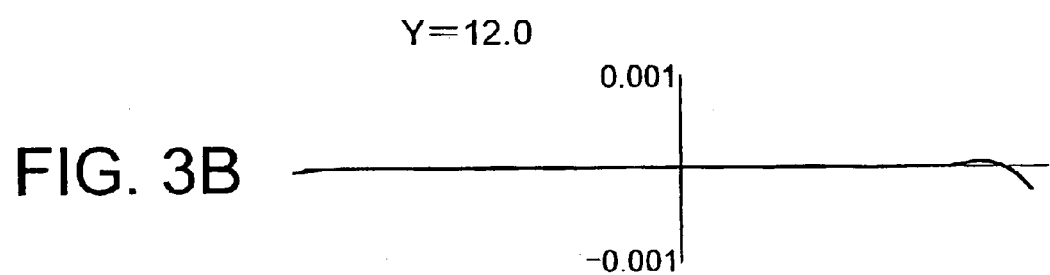
Figure 3C:
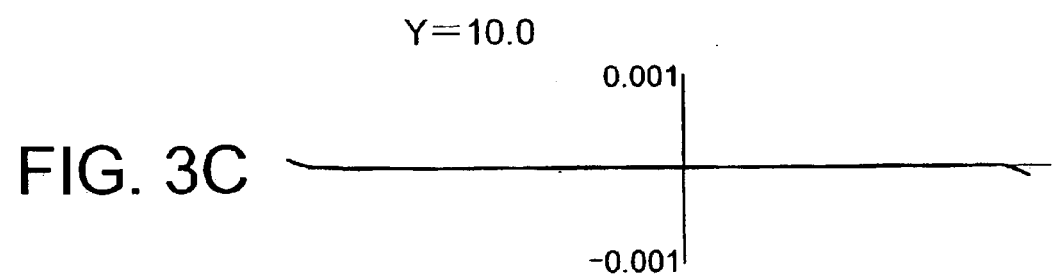
Figure 3D:
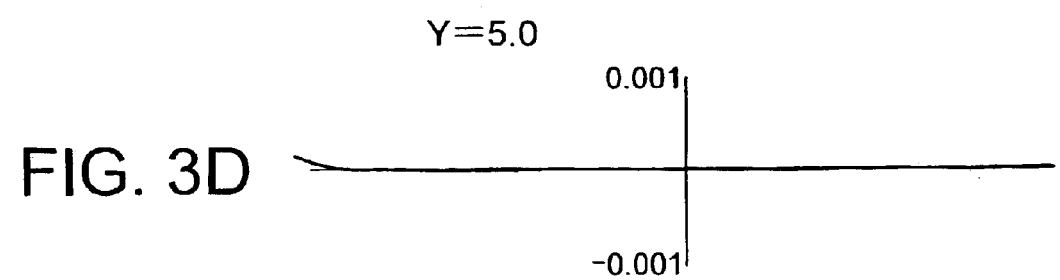
Figure 3E:
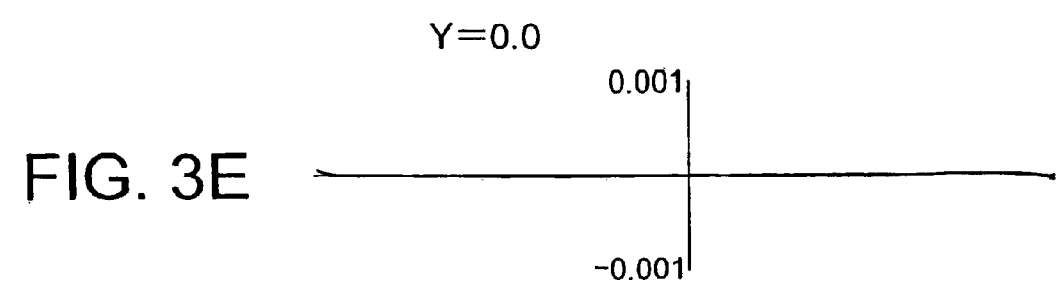
Figure 4:
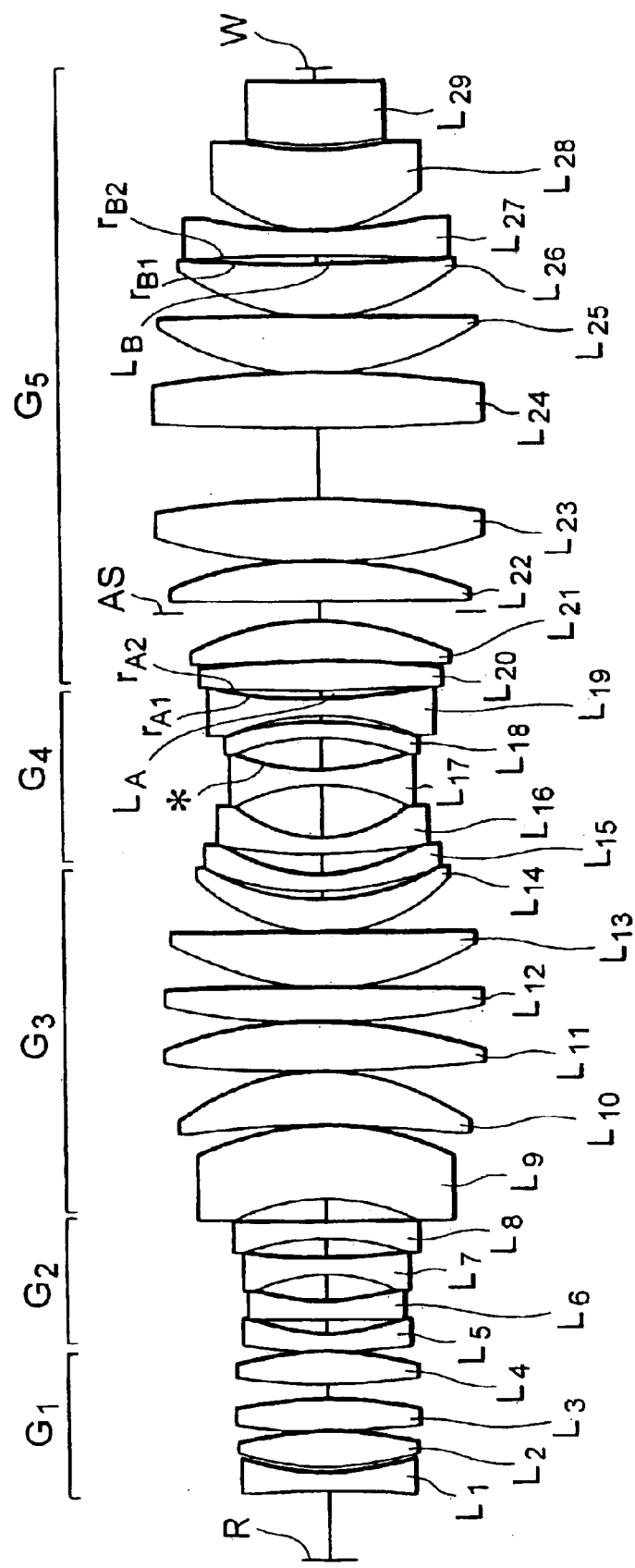
FIG. 4 is a cross-sectional view for showing a lens constitution in a second embodiment.

Embodiments of the present invention will be described with reference to the drawings. FIG. 1 and FIG. 4 respectively show the first embodiment and the second embodiment of the projection optical system according to the present invention. Either of the projection optical systems of the both embodiments is adapted to effect projection-exposure of a pattern on a reticle R onto a wafer W at demagnification(reducing magnification), and is comprised of a first lens group G1 of positive refracting power, a second lens group G2 of negative refracting power, a third lens group G3 of positive refracting power, a fourth lens group G4 of negative refracting power, and a fifth lens group G5 of positive refracting power, in the named order from the reticle R side to the wafer W side. In these drawings, a symbol * denotes an aspherical lens surface.

In the both embodiments, the projection optical system has a magnification of ¼, in which the numerical aperture NA on the image side is 0.75 and the maximum object height is 52.8 mm, which is the size of the reticle R to expose an area of 74.5 mm×74.5 mm, or of 90 mm×55 mm.

All of the optical glasses are made of fused quartz. In the first embodiment 28 lenses in total are used, while in the second embodiment 29 lenses in total are used. Thus, an optical system with excellent performance is provided which is capable of satisfactorily correct a spherical aberration, a coma aberration, an astigmatism, and a distortion in a monochromatic waveform of 248.4 nm of an excimer laser of ultraviolet rays.

The maximum effective diameter of the lens unit is about 250 mm and the distance L between the objects is 1148 mm in the first embodiment, while the maximum effective diameter of the lens unit is about 256 mm and the length L between the objects is 1167 mm in the second embodiment.

Thus, in either of the both embodiments, it is possible to attain a very compact optical system.

The first lens group G1 in the first embodiment is comprised of a meniscus lens L1 with its convex surface facing toward the reticle R side, and two convex lenses L2 and L3.

The second lens group G2 is comprised of a meniscus lens L4 with its convex surface facing toward the reticle R side, two concave lenses L5 and L6, and a meniscus lens L7 with its convex surface facing toward the wafer W side. The lens surface of the lens L4 on the wafer W side is an aspherical surface.

The third lens group G3 is comprised of two positive meniscus lenses L8 and L9 with their convex surfaces facing toward the wafer W side, a double convex lens L12, and a positive meniscus lens L13 with its convex surface facing toward the reticle R side.

The fourth lens group G4 is comprised of two negative meniscus lenses L14 and L15 with their convex surfaces facing toward the reticle R side, two double concave lenses L16 and L17, and a meniscus lens L18 with its convex surface facing toward the reticle R side. The lens surface of the lens L16 on the wafer W side is an aspherical surface.

The fifth lens group G5 is comprised of a positive meniscus lens L19 with its convex surface facing toward the wafer W side, four double convex lenses L20, L21, L22 and L23, two positive meniscus lenses L24 and L25 with their convex surfaces facing toward the reticle R side, a double concave lens L26, and two positive meniscus lenses L27 and L28 with their convex surfaces toward the reticle R side. Thus, the lenses L19 to L25 are consecutive seven positive lenses. In addition, the aperture stop AS is disposed between the lens L21 and the lens L22 inside the fifth lens group G5.

In the present embodiment, a gap between the lens L18 and the lens L19 serves as the first air lens LA, and a gap between the lens L25 and the lens L26 as the second air lens LB.

The first lens group G1 in the second embodiment is comprised of a double concave lens L1 and three double convex lenses L2, L3 and L4.

The second lens group G2 is comprised of a meniscus lens L5 with its convex surface toward the reticle R side, two double concave lenses L6 and L7, and a meniscus lens L8 with its convex surface toward the wafer W side.

The third lens group G3 is comprised of two meniscus lenses L9 and L10 with their convex surfaces facing toward the wafer W side, two double convex lenses L11 and L12, and two positive meniscus lenses L13 and L14 with their convex surfaces facing toward the reticle R side.

The fourth lens group G4 is comprised of two meniscus lenses L15 and L16 with their convex surfaces facing toward the reticle R side, a double concave lens L17, a meniscus lens L18 with its convex surface facing toward the wafer W side, and a double concave lens L19. The lens surface of the lens L17 on the wafer W side is an aspherical surface.

The fifth lens group G5 is comprised of a double convex lens L20, a positive meniscus lens L21 with its convex surface facing toward the wafer W side, four double convex lenses L22, L23, L24 and L25, a positive meniscus lenses L26 with its convex surfaces facing toward the reticle R side, a double concave lens L27, and two positive meniscus lenses L28 and L29 with their convex surfaces facing toward the reticle R side. Thus, the lenses L20 to L26 are consecutive seven positive lenses. In addition, the aperture stop AS is disposed between the lens L21 and the lens L22 inside the fifth lens group G5.

In the present embodiment, a gap between the lens L19 and the lens L20 serves as the first air lens LA, and a gap between the lens L26 and the lens L27 as the second air lens LB.

Specifications of the first and second embodiments will be shown in the following Table 1 and Table 2. In the "lens specifications" in the two tables, "No" in the first column shows the numbers of the respective lens surfaces from the reticle R side, "r" in the second column shows the radius of curvature of each lens surface, "d" in the third column shows a gap between each lens surface and the next lens surface, and the fourth column shows the number of each lens and the number of the lens group.

The lens surface with the symbol * affixed thereto in the first column is an aspherical surface, while "r" in the second column related to an aspherical lens surface indicates an apex radius of curvature.

The shape of the aspherical surface is expressed as follows:

$$Z(y) = (y^2/r)/\{1 - (1 + \kappa(y/r)^2)^{1/2}\} + A \cdot y^4 + B \cdot y^6 + C \cdot y^8 + D \cdot y^{10}$$

where y: the height from the optical axis;

z: the distance from a tangent plane to the aspherical surface in the direction of the optical axis;

r: an apex radius of curvature;

κ: a conical coefficient; and

A, B, C and D: the coefficients of aspherical surfaces.

In [Aspherical Data], the conical coefficient κ, and the coefficients A, B, C and D of the aspherical surfaces are shown.

Glass material for all of the lenses in the first and second embodiments is synthetic quartz, and the index of refraction of this synthetic quartz is n=1.50839. The designed wavelength λ of the lens is λ=248.4 nm.

In the following Table 3, parameters for the conditions (1) to (10) with respect to the first and second embodiments are shown.

TABLE 1

[Lens Specifications]

| No | r | d | | |
|---|---|---|---|---|
| 0 | ∞ | 53.511517 | R | |
| 1 | 424.57965 | 14.000000 | L1 | G1 |
| 2 | 276.57711 | 3.070692 | | |
| 3 | 376.88702 | 22.426998 | L2 | G1 |
| 4 | −388.71851 | 0.501110 | | |
| 5 | 295.50751 | 27.657694 | L3 | G1 |
| 6 | −254.24538 | 0.500000 | | |
| 7 | 358.54914 | 14.000000 | L4 | G2 |
| *8 | 195.82711 | 12.647245 | | |
| 9 | −639.41262 | 13.000000 | L5 | G2 |
| 10 | 150.39696 | 24.664558 | | |
| 11 | −144.69206 | 13.500000 | L6 | G2 |
| 12 | 322.10513 | 28.955373 | | |
| 13 | −109.83313 | 16.000000 | L7 | G2 |
| 14 | −207.92900 | 15.959652 | | |
| 15 | −160.80348 | 26.000000 | L8 | G3 |
| 16 | −141.44401 | 5.067636 | | |
| 17 | −1685.98156 | 41.213135 | L9 | G3 |
| 18 | −211.20833 | 0.774762 | | |
| 19 | 2440.61849 | 33.000000 | L10 | G3 |
| 20 | −448.06815 | 0.500000 | | |
| 21 | 564.27683 | 33.000000 | L11 | G3 |
| 22 | 5923.72721 | 0.500000 | | |
| 23 | 243.35532 | 44.114198 | L12 | G3 |
| 24 | −21708.35359 | 3.000000 | | |

TABLE 1-continued

| | | | | |
|---|---|---|---|---|
| 25 | 153.14351 | 40.732633 | L13 | G3 |
| 26 | 319.85990 | 3.000000 | | |
| 27 | 339.65899 | 19.000000 | L14 | G4 |
| 28 | 157.46424 | 18.907281 | | |
| 29 | 743.92557 | 16.000000 | L15 | G4 |
| 30 | 112.50731 | 38.722843 | | |
| 31 | −161.32909 | 14.000000 | L16 | G4 |
| *32 | 281.95994 | 26.642118 | | |
| 33 | −160.27838 | 17.000000 | L17 | G4 |
| 34 | 449.56755 | 10.306295 | | |
| 35 | 1951.49846 | 19.000000 | L18 | G4 |
| 36 | 877.78564 | 6.606143 | LA | |
| 37 | −9151.87550 | 29.645235 | L19 | G5 |
| 38 | −299.45605 | 0.532018 | | |
| 39 | 3339.76762 | 35.747859 | L20 | G5 |
| 40 | −299.74075 | 0.646375 | | |
| 41 | 822.44376 | 33.000000 | L21 | G5 |
| 42 | −550.76603 | 2.970732 | | |
| 43 | — | 16.774949 | AS | |
| 44 | 562.40254 | 31.717853 | L22 | G5 |
| 45 | −1626.95189 | 71.859285 | | |
| 46 | 481.08843 | 33.425832 | L23 | G5 |
| 47 | −1672.85856 | 0.500000 | | |
| 48 | 188.39765 | 49.237219 | L24 | G5 |
| 49 | 3293.78061 | 0.500000 | | |
| 50 | 158.00533 | 35.070956 | L25 | G5 |
| 51 | 502.57007 | 11.179008 | LB | |
| 52 | −1621.68742 | 18.000000 | L26 | G5 |
| 53 | 226.39742 | 2.757724 | | |
| 54 | 122.08486 | 43.603688 | L27 | G5 |
| 55 | 278.54937 | 2.018765 | | |
| 56 | 350.99846 | 39.566779 | L28 | G5 |
| 57 | 5458.39044 | 12.000001 | | |
| 58 | ∞ | | W | |

[Aspherical Data]

No = 8  κ = 0.0  A = −0.528194 × $10^{-7}$  B = −0.194253 × $10^{-11}$
C = −0.335061 × $10^{-16}$  D = 0.130681 × $10^{-20}$
No = 32  κ = 0.0  A = 0.283261 × $10^{-7}$  B = −0.283101 × $10^{-11}$
C = −0.334419 × $10^{-16}$  D = 0.469334 × $10^{-20}$

TABLE 2

[Lens Specifications]

| No | r | d | | |
|---|---|---|---|---|
| 0 | ∞ | 44.999990 | R | |
| 1 | −1076.07977 | 13.393500 | L1 | G1 |
| 2 | 191.74628 | 2.678700 | | |
| 3 | 203.83543 | 30.358600 | L2 | G1 |
| 4 | −281.63049 | 0.100000 | | |
| 5 | 698.39441 | 22.322500 | L3 | G1 |
| 6 | −386.51872 | 12.858341 | | |
| 7 | 474.23427 | 25.269070 | L4 | G1 |
| 8 | −243.56953 | 0.100000 | | |
| 9 | 555.35420 | 13.393500 | L5 | G2 |
| 10 | 158.39107 | 12.669423 | | |
| 11 | −1459.40394 | 13.393500 | L6 | G2 |
| 12 | 239.04446 | 20.315320 | | |
| 13 | −131.22470 | 13.393500 | L7 | G2 |
| 14 | 546.91788 | 15.099178 | | |
| 15 | −176.15961 | 13.393500 | L8 | G2 |
| 16 | −7754.62824 | 18.664763 | | |
| 17 | −153.15107 | 56.461730 | L9 | G3 |
| 18 | −214.76152 | 0.089290 | | |
| 19 | −814.31313 | 43.261435 | L10 | G3 |
| 20 | −183.40367 | 0.089290 | | |
| 21 | 1470.53178 | 38.708260 | L11 | G3 |
| 22 | −358.57233 | 0.089290 | | |
| 23 | 643.08414 | 28.890312 | L12 | G3 |
| 24 | −2416.29189 | 0.089290 | | |
| 25 | 237.16282 | 41.777183 | L13 | G3 |
| 26 | 4606.42948 | 0.089290 | | |
| 27 | 133.95397 | 28.708461 | L14 | G3 |
| 28 | 177.35032 | 7.202218 | | |
| 29 | 237.42959 | 13.393500 | L15 | G4 |
| 30 | 158.02115 | 16.613035 | | |
| 31 | 521.11453 | 13.393500 | L16 | G4 |
| 32 | 113.10059 | 41.189093 | | |
| 33 | −157.49963 | 13.393500 | L17 | G4 |
| *34 | 269.77049 | 23.416874 | | |
| 35 | −205.56228 | 13.393500 | L18 | G4 |
| 36 | −244.89882 | 5.826132 | | |
| 37 | −170.42662 | 13.393500 | L19 | G4 |
| 38 | 483.35645 | 6.476227 | LA | |
| 39 | 2151.04236 | 23.455914 | L20 | G5 |
| 40 | −779.82637 | 0.100000 | | |
| 41 | −1578.31666 | 31.115587 | L21 | G5 |
| 42 | −238.39783 | 8.929000 | | |
| 43 | — | 7.821200 | AS | |
| 44 | 25030.38813 | 31.251500 | L22 | G5 |
| 45 | −317.90570 | 0.100000 | | |
| 46 | 422.49997 | 49.109500 | L23 | G5 |
| 47 | −818.65105 | 59.359471 | | |
| 48 | 3033.59836 | 40.180500 | L24 | G5 |
| 49 | −813.42694 | 0.089290 | | |
| 50 | 239.06328 | 44.645000 | L25 | G5 |
| 51 | −11506.10547 | 0.089290 | | |
| 52 | 181.73186 | 40.297673 | L26 | G5 |
| 53 | 1121.02103 | 8.827244 | LB | |
| 54 | −1156.72532 | 17.858000 | L27 | G5 |
| 55 | 438.30163 | 0.100000 | | |
| 56 | 128.66827 | 63.530555 | L28 | G5 |
| 57 | 328.26122 | 2.678700 | | |
| 58 | 305.11181 | 48.192777 | L29 | G5 |
| 59 | 739.10052 | 11.137249 | | |
| 60 | ∞ | | W | |

[Aspherical Data]

No = 34  κ = 0.0  A = 0.331422 × $10^{-7}$  B = −0.283218 × $10^{-11}$
C = −0.694259 × $10^{-16}$  D = 0.689446 × $10^{-20}$

TABLE 3

| | First Embodiment | Second Embodiment |
|---|---|---|
| (1) D/L | 0.225 | 0.206 |
| (2) \|PA−PB\| × L | 0.78 | 0.43 |
| (3) \|PA\| × L | 0.716 | 1.52 |
| (4) \|PB\| × L | 1.43 | 1.03 |
| (5) Y/L | 0.0115 | 0.0113 |
| (6) NA | 0.75 | 0.75 |
| (7) f2/f4 | 1.40 | 1.26 |
| (8) f5/L | 0.15 | 0.137 |
| (9) f4/L | −0.044 | −0.047 |
| (10) f2/L | −0.061 | −0.060 |

The spherical aberration, the astigmatism and the distortion in the first embodiment are shown in FIGS. 2A to 2C, while the lateral aberrations in the same embodiment are shown in FIGS. 3A to 3E. In the same manner, the respective aberrations in the second embodiment are shown in FIGS. 5A to 5C and FIGS. 6A to 6E. In these aberrations views, NA denotes the numerical aperture and Y the image height. In the view of astigmatism, the dotted line indicates a meridional image surface and the solid line a sagittal image surface.

As clearly seen from the respective aberration views, each embodiment has excellent image formation performance by adapting the required lens constitution and satisfying the conditions (1) to (10).

As described above, according to the present invention, it is possible to correct a fluctuation in field angle owing to a coma aberration to reduce the effective diameter of the lens since there are provided surfaces to act against the light flux in font and the rear of the aperture stop.

It is possible to attain an excellent image formation performance with a high NA on a wide image surface in a compact apparatus, by thus suppressing generation of aberrations. That is, it is possible to obtain a projection optical system for exposure satisfying both of high resolving power and a wide exposure area.

What is claimed is:

1. A projection optical system for projection exposure which forms an image of a first surface onto a second surface, the projection optical system comprising:

a first lens group with positive power which is arranged in an optical path between the first surface and the second surface;

a second lens group with negative power which is arranged in an optical path between the first lens group and the second surface;

a third lens group with positive power which is arranged in an optical path between the second lens group and the second surface;

a fourth lens group with negative power which is arranged in an optical path between the third lens group and the second surface; and a fifth lens group with positive power which is arranged in an optical path between the fourth lens group and the second surface;

wherein at least one lens group among the first, second, and third lens groups has an aspherical surface, wherein the first lens group has at least two positive lenses, the second lens group has at least two negative lenses, the third lens group has at least three positive lenses, and the fourth lens group has at least two negative lenses, and wherein the fifth lens group has at least six positive lenses.

2. The projection optical system according to claim 1, wherein at least one of the fourth and fifth lens groups has an aspherical surface.

3. The projection optical system according to claim 1, wherein the fifth lens group has an aperture stop.

4. A projection exposure method for transferring a pattern on a projection original onto a photosensitive substrate, comprising:

projecting an image of said pattern onto said photosensitive substrate with a projection optical system according to claim 1.

5. A projection optical system for projection exposure which forms an image of a first surface onto a second surface, the projection optical system comprising:

a first lens group with positive power which is arranged in an optical path between the first surface and the second surface;

a second lens group with negative power which is arranged in an optical path between the first lens group and the second surface;

a third lens group with positive power which is arranged in an optical path between the second lens group and the second surface;

a fourth lens group with negative power which is arranged in an optical path between the third lens group and the second surface; and a fifth lens group with positive power which is arranged in an optical path between the fourth lens group and the second surface;

wherein at least one lens group among the first, second, and third lens groups has an aspherical surface, and wherein the following condition is satisfied:

NA>0.65 where

NA: a maximum numerical aperture on the image aide.

6. A projection exposure method for transferring a pattern on a projection original onto a photosensitive substrate, comprising:

projecting an image of said pattern onto said photosensitive substrate with a projection optical system according to claim 5.

7. The projection optical system according to claim 5, wherein the first lens group has at least two positive lenses, the second lens group has at least two negative lenses, the third lens group has at least three positive lenses, and the fourth lens group has at least two negative lenses.

8. The projection optical system according to claim 7, wherein the fifth lens group has at least six positive lenses.

9. The projection optical system according to claim 7, wherein at least one of the fourth and fifth lens groups has an aspherical surface.

10. The projection optical system according to claim 5, wherein at least one of the fourth and fifth lens groups has an aspherical surface.

11. The projection optical system according to claim 5, wherein the fifth lens group has an aperture stop.

12. A projection optical system for projection exposure which forms an image of a first surface onto a second surface, the projection optical system, comprising:

a lens arrangement having at least a first waist of lenses, wherein the lens arrangement comprises a lens having an aspherical surface arranged before said first waist, and/or a lens having an aspherical surface arranged after said first waist, wherein the lens arrangement has a first lens group having positive power, a second lens group having negative power, a third lens group having negative power, a fourth lens group having negative power, and a fifth lens group having positive power, and the second lens group has a lens having an aspherical surface.

13. The projection optical system according to claim 12, wherein the lens arrangement has a lens having an aspherical surface arranged before said first waist and a lens having an aspherical surface arranged after said first waist, and wherein the projection optical system further comprises at least two spherical lenses arranged between the lens having the aspherical surface arranged before said first waist and the lens having the aspherical surface arranged after said first waist.

14. The projection optical system according to claim 12, wherein a lens having an aspherical surface is arranged in said second lens group before the waist.

15. The projection optical system according to claim 12, wherein the projection optical system has a plurality of waists of lenses, and wherein the first waist is arranged most toward a first surface side among the plurality of waists.

16. The projection optical system according to claim 12, wherein the following condition is satisfied:

NA>0.65 where

NA: a maximum numerical aperture on the image side.

17. A projection exposure method for transferring a pattern on a projection original onto a photosensitive substrate, comprising:

projecting an image of said pattern onto said photosensitive substrate with a projection optical system according to claim 16.

18. A projection exposure method for transferring a pattern on a projection original onto a photosensitive substrate, comprising:

projecting an image of said pattern onto said photosensitive substrate with a projection optical system according to claim 12.

19. A projection optical system for projection exposure which forms an image of a first surface onto a second surface, the projection optical system comprising:

a lens arrangement having at least a first waist of lenses, wherein the lens arrangement comprises: a lens having an aspherical surface arranged before said first waist, and/or a lens having an aspherical surface arranged after said first waist, and wherein the following condition is satisfied:

NA>0.65 where

NA : a maximum numerical aperture on the image side, and wherein the lens arrangement has a first lens group having positive power, a second lens group having negative power, a third lens group having negative power, a fourth lens group having negative power, and a fifth lens group having positive power, wherein the second lens group has a lens having an aspherical surface.

20. The projection optical system according to claim 19, wherein a lens having an aspherical surface is arranged in said second lens group before the waist.

21. The projection optical system according to claim 19, wherein the projection optical system has a plurality of waists of lenses, and wherein the first waist is arranged at the most first surface side among the plurality of waists.

22. A projection exposure method for transferring a pattern on a projection original onto a photosensitive substrate, comprising:

projecting an image of said pattern onto said photosensitive substrate with a projection optical system according to claim 19.

* * * * *